(12) United States Patent
Lin et al.

(10) Patent No.: US 10,290,927 B2
(45) Date of Patent: May 14, 2019

(54) ELECTRONIC DEVICE WITH PROXIMITY SENSOR

(71) Applicant: HEWLETT-PACKARD DEVELOPMENT COMPANY, L.P., Houston, TX (US)

(72) Inventors: Cheng-Fang Lin, Taipei (TW); Wan-Lin Su, Taipei (TW); Huai-Yung Yen, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 164 days.

(21) Appl. No.: 15/118,591

(22) PCT Filed: Apr. 24, 2014

(86) PCT No.: PCT/US2014/035274
§ 371 (c)(1),
(2) Date: Aug. 12, 2016

(87) PCT Pub. No.: WO2015/163880
PCT Pub. Date: Oct. 29, 2015

(65) Prior Publication Data
US 2017/0047645 A1    Feb. 16, 2017

(51) Int. Cl.
*H01Q 3/24* (2006.01)
*H01Q 1/24* (2006.01)
*G06F 1/16* (2006.01)
*H04M 1/725* (2006.01)
*H01Q 1/22* (2006.01)

(52) U.S. Cl.
CPC .......... *H01Q 1/245* (2013.01); *G06F 1/1698* (2013.01); *H01Q 1/2291* (2013.01); *H01Q 1/243* (2013.01); *H04M 1/72569* (2013.01); *H04M 1/72577* (2013.01)

(58) Field of Classification Search
None
See application file for complete search history.

(56) References Cited

U.S. PATENT DOCUMENTS

| | | | |
|---|---|---|---|
| 7,656,964 B1 * | 2/2010 | DeCoste | H03F 3/24 330/149 |
| 8,432,322 B2 | 4/2013 | Amm et al. | |
| 8,781,470 B2 * | 7/2014 | Lee | H04L 1/1809 370/238 |
| 2004/0214621 A1 * | 10/2004 | Ponce De Leon | H01Q 1/242 455/575.8 |
| 2009/0284438 A1 * | 11/2009 | Matsunaga | H01Q 1/2291 343/876 |

(Continued)

FOREIGN PATENT DOCUMENTS

| | | | | |
|---|---|---|---|---|
| EP | 1298809 | * | 4/2003 | ............... H04B 1/38 |
| TW | M456027 | | 6/2013 | |

*Primary Examiner* — Trinh V Dinh
(74) *Attorney, Agent, or Firm* — HPI Patent Department

(57) ABSTRACT

An electronic device includes an antenna, a wireless transmitter, a proximity sensor and a controller. The antenna includes a first radiating element and a second radiating element which has a different length than the first radiating element. The wireless transmitter is to send a radio signal to the antenna and the controller is to disable the first radiating element in response to the proximity sensor detecting a body part.

15 Claims, 4 Drawing Sheets

(56) References Cited

U.S. PATENT DOCUMENTS

| | | | |
|---|---|---|---|
| 2010/0279751 A1 | 11/2010 | Pourseyed et al. | |
| 2011/0012792 A1* | 1/2011 | Krenz | H01Q 21/30 |
| | | | 343/702 |
| 2012/0190398 A1 | 7/2012 | Leukkunen | |
| 2013/0005413 A1* | 1/2013 | Brogle | G01D 5/2405 |
| | | | 455/575.7 |
| 2013/0172045 A1 | 7/2013 | Caballero et al. | |
| 2014/0134958 A1* | 5/2014 | Sanchez | H01Q 3/24 |
| | | | 455/73 |
| 2015/0155614 A1* | 6/2015 | Youn | H04M 1/0249 |
| | | | 343/702 |
| 2016/0322701 A1* | 11/2016 | Lin | H01Q 1/245 |

* cited by examiner

ELECTRONIC DEVICE WITH PROXIMITY SENSOR

BACKGROUND

Electronic devices such as computer devices and handheld electronic devices may include an antenna to enable them to communicate wirelessly with other devices and communication networks. For example the electric device may have short range communications circuitry to communicate using Wifi (IEEE 802.11) or a similar communication standard and/or long range wireless communications circuitry to communicate using cellular telephone standards such as GSM, EDGE and UMTS etc.

In many countries governments regulate the power at which radio signals can be transmitted by an electronic device. These regulations and power transmission limits vary from country to country and over time. One measure is the Specific Absorption Rate (SAR) which is the rate at which energy is absorbed by a human body exposed to a radio signal. The SAR may be defined as power per mass of tissue and for example measured in Watts per kilogram. The SAR limit may for example be specified as an allowable SAR as measured at a particular distance from the device.

BRIEF DESCRIPTION OF THE DRAWINGS

Examples of the present disclosure will now be described, by way of non-limiting example only, with reference to the accompanying drawings, in which.

DETAILED DESCRIPTION

Electronic devices may be provided with wireless communications circuitry. Examples of electronic devices include printers, office equipment, household devices with electronic components and computer devices. Computer devices include desktop computers, laptop computers and handheld computer devices such as tablet computers, mobile phones, electronic book readers etc.

The present disclosure proposes an electronic device including a first radiating element and second radiating element together with a wireless transmitter, a controller and a proximity sensor. When the proximity sensor detects an external object such as a body part, the controller disables the first radiating element. As explained in more detail below this may reduce the transmission power.

Figure 1:
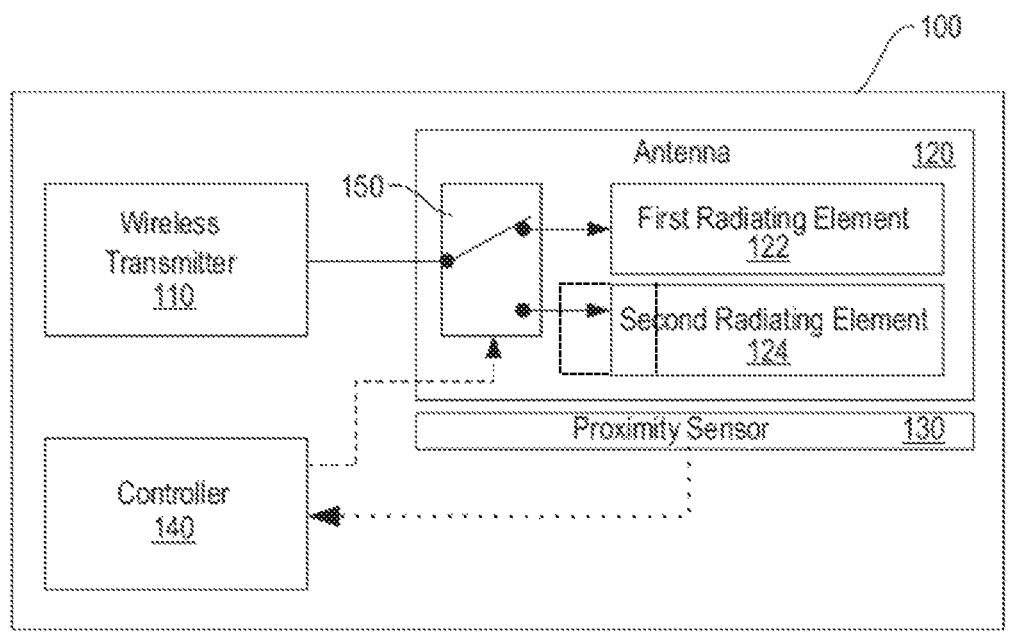
FIG. 1 is a schematic diagram showing an example of an electronic device according to the present disclosure.

FIG. 1 shows a schematic example of an electronic device according to an example of the present disclosure. The electronic device 100 includes a wireless transmitter 110, an antenna 120, a proximity sensor 130 and a controller 140. The electronic device may include other components such as a display, a central processing unit (CPU), a memory, a disk or other storage device, one or more I/O devices and a connecting bus etc (not shown in FIG. 1). The wireless transmitter may be connected to the CPU and may act as an I/O out device for radio communications.

The wireless transmitter 110 may for example be a transceiver capable of both producing and receiving radio signals. It may for instance be a chipset for communicating according to a particular standard such as GSM, EDGE, UMTS or Wifi (IEEE 802.11) standard etc. A radio signal is a radio frequency signal which may be sent to an antenna for transmission as a radio wave and includes any signals which may be used by cellular telephones or by local wireless communications, for example frequencies in the range 1 MHz to 6 GHz. In one example the wireless transmitter may be configured to generate WiFi signals in the 2.4 GHz or 5 GHz frequency bands.

The wireless transmitter 110 is to generate output signals for the antenna 120. The antenna 120 may be connected to the wireless transmitter 110 by a waveguide, coaxial cable or other transmission medium as indicated by the solid line between the wireless transmitter 110 and the antenna 120 in FIG. 1.

The antenna 120 may be a device which converts electrical power signals to radio waves. The antenna includes a first radiating element 122 and a second radiation element 124. The radiating elements may for example have a patch antenna structure, inverted F-antenna structure, closed or open slot antenna structure etc. The first and second radiating elements 122, 124 may be located near an edge of the electronic device.

A proximity sensor 130 is provided near the antenna 120. For example the proximity sensor may be a separate device located adjacent to, or close to, the antenna 120 as shown in FIG. 1. In other examples the proximity sensor may be integrated into the antenna itself. In one example a radiating element of the antenna may act as the proximity sensor.

The proximity sensor is a device which is able to sense when an external object approaches the antenna. An external object is an object external to the electronic device 100 and may for example be a human body part. The proximity sensor may for example be a capacitive sensor. A capacitive sensor detects presence of an external object through changes in capacitance. For example a capacitive sensor may include a capacitor and a circuit for measuring the capacitance of the capacitor. When an external object approaches the capacitor, for example by contacting or approaching close to a casing of the electrical device, the capacitance of the external object interacts with the capacitor. This may change the effective capacitance of the capacitor. The capacitive sensor may send a signal to the controller 140 based on the change in capacitance. For example the signal may be a signal indicating the capacitance, a signal indicating the estimated distance of an external object from the capacitive sensor or a binary signal indicating presence or absence of an external object etc. Based on this signal, the controller 140 is able to determine when an external object, such as a human body part, approaches close to the antenna 120.

Figure 5:
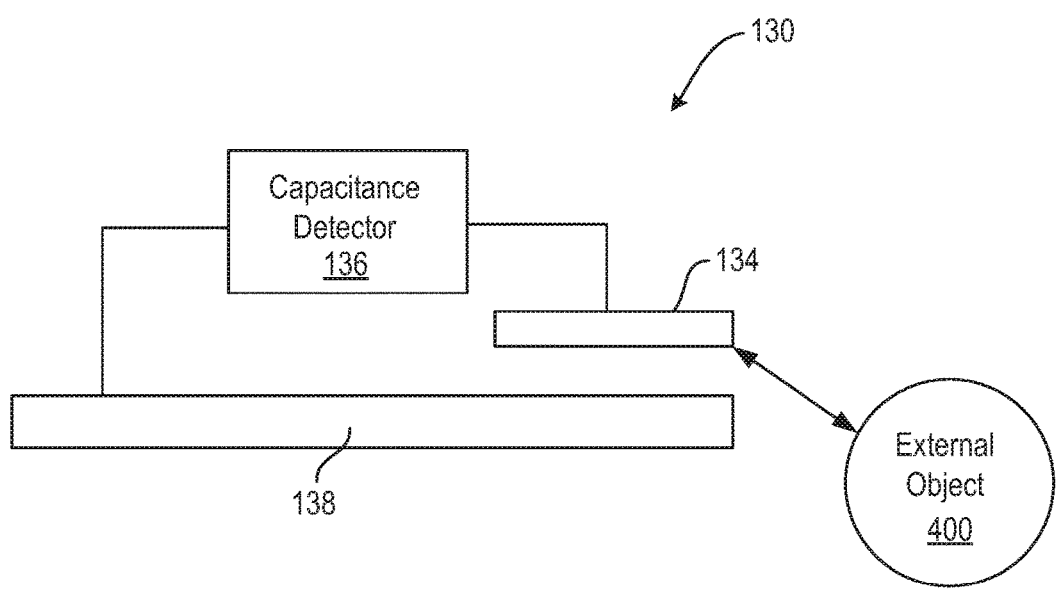
FIG. 5 shows an example of a proximity sensor according to the present disclosure.

FIG. 5 shows an example proximity sensor 130 which detects proximity by changes in capacitance. The proximity sensor in this example comprises a pair of conductive elements 134, 136 which form a capacitor having a capacitance and a capacitance detector 136 which detects the capacitance. The capacitance may be affected by presence of an external object 400 if the object is close enough. In this way presence of an external object may be detected.

In one example the conductive element 134 may be a radiating element of the antenna itself, such as element 122 or 124 of FIG. 1. In another example the conductive element 134 may be a parasitic antenna element not directly connected to a feedline of the antenna. In another example, the conductive element 134 may be an independent conductive element separate from the antenna. In one example the conductive element 138 is a casing of the electronic device. In other examples the conductive element 138 is not part of the electronic device casing. In one example the capacitive detector 136 includes a signal generator and a current sensor (not shown). The signal generator may generate a signal which passes between the conductive element 134 and the conductive element 138. The capacitance of the two conductive elements can then be derived based on the current sensed by the current sensor. The capacitance will be affected by presence of a close external object 400 and this change in capacitance can be detected. The capacitance detector may send a signal to the controller as discussed above. The sensitivity of the capacitance detector and the distance at which it can detect presence of an external object can be chosen based on the design requirements and desired sensitivity.

Figure 2:
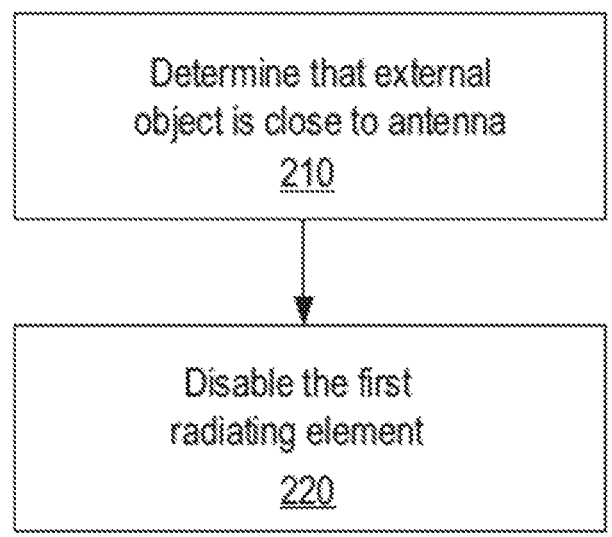
FIG. 2 is a flow diagram showing an example method according to the present disclosure.

A method flow diagram for the controller 140 is shown in FIG. 2. At block 210 the controller determines that an external object is close to the antenna. This determination may for example be in response to a signal from the proximity sensor 130.

At block 220, in response to detecting an external object close to the antenna, the controller may disable the first radiating element 122. As used herein "disable" means to make the first radiating element unavailable for radio signal transmission. For example this may be achieved by using a switch 150 to decouple the first radiating element from the output of the wireless transmitter 110. The switch 150 may for example be a transistor, a diode, or any circuits or devices to selectively couple or uncouple a transmission path. The switch 150 may be integrated into the design of the antenna 120 or may be provided externally to the antenna.

In addition to disabling the first antenna element, the controller 140 may also enable the second radiating element 124 in response to detecting an external object close to the antenna. As used herein "enable" means to enable the second radiating device to transmit a radio signal based on the output from the wireless transmitter. For example this may be achieved by using a switch to couple an output of the wireless transmitter to the second radiating element.

There may be a single switch 150 to selectively couple the radio signal to one of the first radiating element 122 and the second radiating element 124, as shown in FIG. 1. In this case the disabling of the first radiating element and enabling of the second radiating element may be carried out at the same time by switching the switch 150. In another example (not shown) each radiating element may be coupled to the controller 140 by a separate switch. In that case the enabling or disabling of the first radiating element and second radiating element may be independent of each other and may carried out at the same time or at different times. In both cases, the switch may for example be a transistor, a diode, or any circuits or devices to selectively couple or uncouple a transmission path and may be integrated into the design of the antenna 120 or may be provided externally to the antenna.

The dashed line in FIG. 1 shows an example of the connections between the controller 140 and the switch 150. This may be used to send control signals to the switch. The dotted line in FIG. 1 shows an example of a connection between the proximity sensor 130 the controller 140. This may be used to send signals from the proximity sensor to the controller.

The first radiating element may be a "high power radiating element" configured to transmit a radio signal at a higher power than the second radiating element which may be a "low power radiating element". In the context used herein the term "high power radiating element" and "low power radiating element" are used in a relative sense meaning the high power radiating element is configured to transmit at a higher power than the low power radiating element.

The first and second radiating elements may have different lengths. In one example the length of the first radiating element is greater than the length of the second radiating element. In another example the length of the first radiating element is shorter than the length of the second radiating element. For instance the radiating elements may be patch antennas and the first radiating element may have a conductive trace which is longer or shorter than a conductive trace of the second radiating element. Certain lengths of radiating element will transmit radio waves at higher power due to resonant frequency and impedance considerations. That is certain lengths of radiating element will transmit the radio waves more efficiently. Compared to the second radiating element, the first radiating element may have a length which is closer to a resonant length for a particular frequency. For example, if a first radiating element is at a resonant length for a particular radio frequency used by the wireless transmitter and the second radiating element is less than or greater than the resonant length, then the second radiating element will transmit that particular frequency at a lower power than the first radiating element.

In one example the first radiating element is configured to transmit the radio signal at −2 dB to −4 dB, while the second radiating element is to transmit the radio signal at −5 dB to −6 dB.

Therefore, by selectively coupling a radio signal to one of the first and second radiating elements, it is possible to vary the transmission power. This approach may be relatively simple and cheap to implement and avoids using a resistor or attenuator which may degrade the radio signal. This approach also means that it is not necessary to change the power of the signal output by the wireless transmitter, which may simplify circuit design and is also useful if the wireless transmitter is not capable of varying the power of its output signal.

Figure 3:
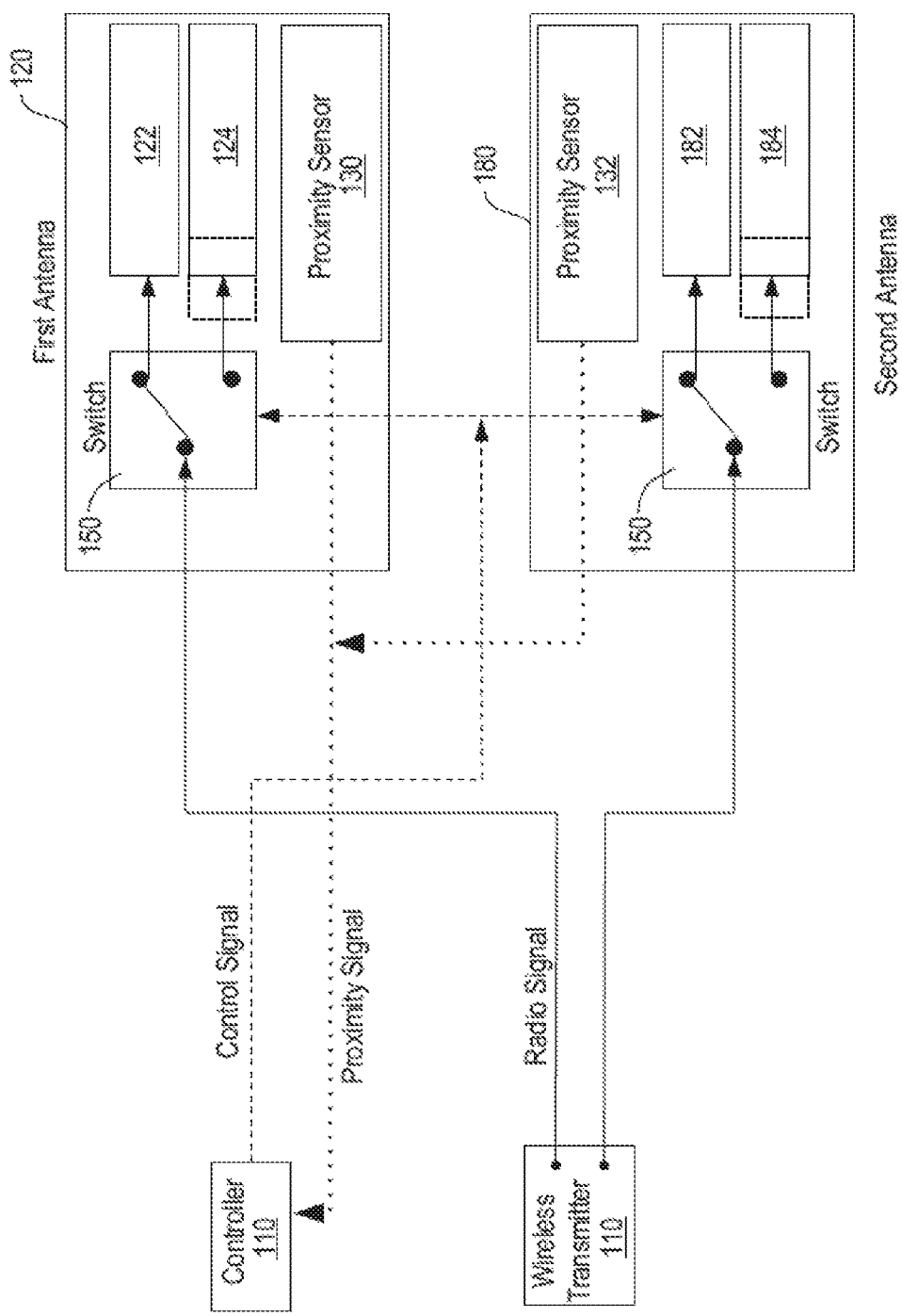
FIG. 3 is a schematic diagram showing another example of an electronic device according to the present disclosure.

FIG. 3 is another example of an electronic device. The electronic device of FIG. 3 is similar to the example shown in FIG. 1 and like reference numerals denote like parts. The device differs in that in addition to the first antenna 120, the device has a second antenna 180. The second antenna 180 has two radiating elements 182 and 184 which may have different lengths or output powers. In one example, the first antenna 120 and the second antenna 180 are identical antennas. In that case only one antenna may be used at a time or they may be both used simultaneously. Having identical antennas in different locations may provide better coverage or redundancy in the case that one antenna malfunctions. In another example the antennas may be different antennas configured to transmit at different frequencies. For example the first antenna 120 may be configured to transmit at 2.4 GHz, while the second antenna 180 may be configured to transmit at 5 GHz. In that case the electronic device may determine which of the first and second antennas to use, based on the frequencies supported by the nearest access point, based on a user selection, or based on the fastest transmission speed etc.

Just as the first antenna 120 has an associated proximity sensor 130, the second antenna 180 has an associated proximity sensor 132 which is connected to the controller 140. Each proximity sensor should be close to the antenna which it is associated with, so that it can detect when an external object approaches close to the antenna. The proximity sensors 130 and 132 can send a signal to the controller 140 to indicate proximity of an external object as indicated by the dotted lines in FIG. 3. The controller 140 is able to enable or disable the radiating elements of the first and second antennas by using control signals as indicated by the dashed lines in FIG. 3.

The controller 140 is to disable the first radiating element 182, and may also enable the second radiating element 184 of the second antenna 180, in response to the proximity sensor detecting an external object, in the same way that the controller is able to switch between the radiating elements 122 and 124 of the first antenna as described above for FIG. 1.

Figure 4:
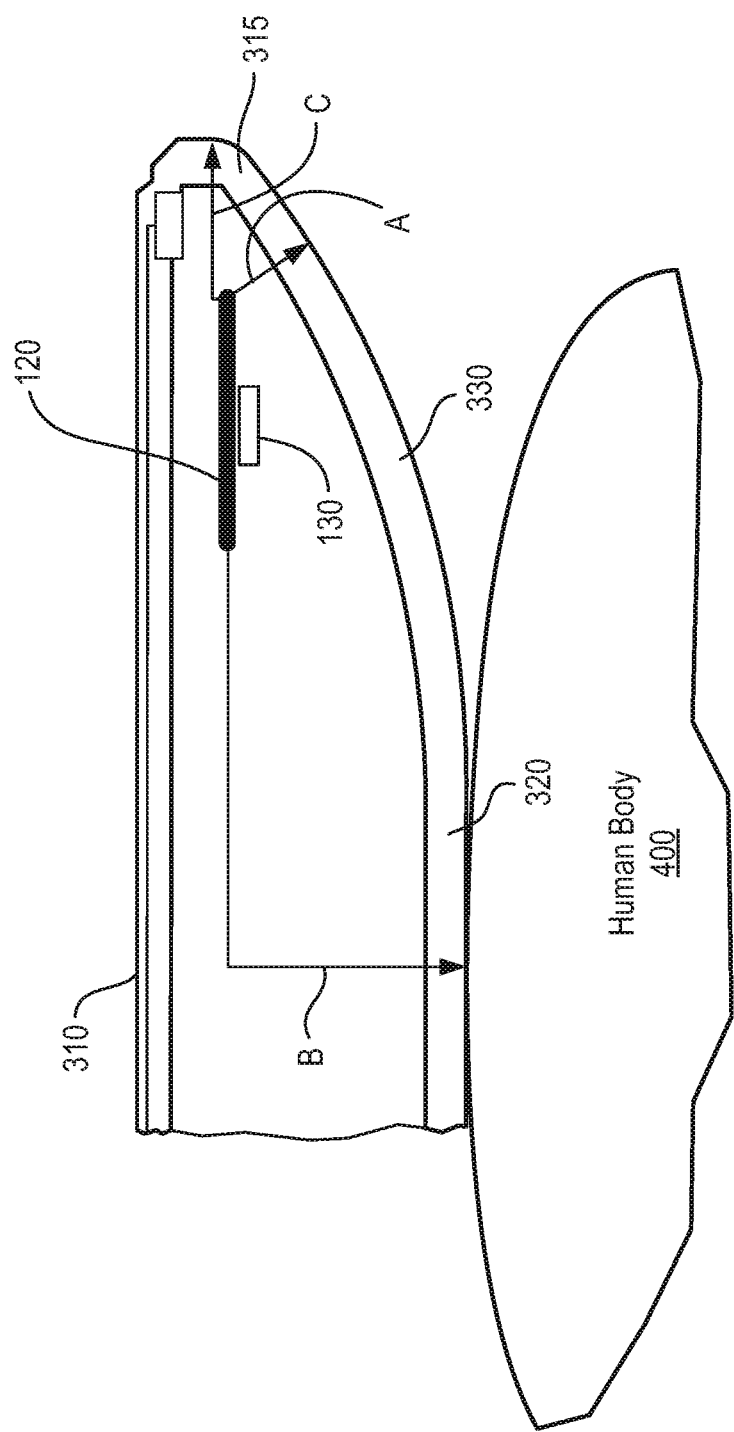
FIG. 4 is a cross sectional diagram showing an example structure of a part of an electronic device according to the present disclosure.

FIG. 4 is a cross sectional diagram showing an example structure of one end of an electronic device. The electronic device has a casing which includes a first wall (e.g. a front wall) 310, a second wall (e.g. a back wall) 320 and a curved portion 330 linking the two walls. The electronic device casing may have an edge end 315, which may be a joining point of the curved wall 330 and one of the other walls. An antenna 120 may be conveniently located inside the curved portion of the casing 330. For example this may enable the antenna to be isolated from other electronic components which it might otherwise interfere with. A proximity sensor 130 may be located close to the antenna 120 (e.g. as shown in FIG. 4), or may be integrated into the antenna 120.

The proximity of the antenna to a human body part and the strength of a radio signal from the antenna is a concern for safety considerations. It may, for example, be desired that the signal strength is kept within a Specific Absorption Rate (SAR). With respect to a SAR, the back wall 320, curved wall 330 and edge 315 may be of particular concern, as a user may rest these parts of the device on a body part such as a leg or thigh in normal use. The front wall 310 may be of less concern as it includes a display and so the user generally will not rest that part on their lap in normal use. Further, in some examples the front wall 310 may be shielded, or a display screen and associated circuitry on the front wall may effectively limit radio signals passing through the front wall.

FIG. 4 shows an example in which the back wall 320 of the electronic device rests on a human body part 400, such as a lap of the user. If the device is moved slightly then the curved wall 330 or edge 315 may also come into contact with a human body part 400. Out of the curved wall 330, back wall 320 and edge 315, it may be that the curved portion 330 of the casing is the part which is closest to the antenna 120. In the example of FIG. 4, the distance A between the antenna 120 and the curved wall 330 is less than distance B between the antenna 120 and the back wall 320, and less than the distance C between the antenna 120 and the edge 315 of the device casing. As such a transmission power of the antenna which is acceptable when a user touches another part of the casing, may be too high when a user touches the curved portion 330 of the casing.

As a result of this, the radio power absorbed by a user may be within a desired or regulatory limit, such as an SAR, when a user contacts the back wall 320, but may exceed the limit when the user touches the curved wall 330. By placing a proximity sensor 130 near the curved wall 330, it can be detected if a user's body part approaches close to or touches the curved wall 330. In response to detecting a user's body part approaching close to or touching the curved wall 330, the transmission power may be reduced by switching from a first radiating element to a second radiating element as discussed above with reference to FIGS. 1-3. In this way the transmission power of the antenna may be kept within the SAR limit.

FIG. 4 shows an example with one antenna. Where there are two antennas, the antennas may for example be located behind curved portions of the casing at opposite ends of the device, or at the same end but in opposite corners.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An electronic device comprising:
    an antenna including a first radiating element and a second radiating element; the second radiating element having a different length than the first radiating element;
    a wireless transmitter to send a radio signal to the antenna;
    a proximity sensor; and
    a controller to disable the first radiating element and to enable the second radiating element, the disabling and enabling in response to the proximity sensor detecting a body part, only one of the first and second radiating elements enabled at a time.

2. The electronic device of claim 1 wherein the second radiating element is to transmit radio waves at lower power than the first radiating element.

3. The electronic device of claim 1 wherein the proximity sensor is a capacitive sensor.

4. The electronic device of claim 1 comprising a switch between the wireless transmitter and the radiating elements; wherein the controller is to control the switch to direct the radio signal to the second radiating element in response to the proximity sensor detecting the body part.

5. The electronic device of claim 1 wherein the antenna, wireless transmitter, proximity sensor and controller are in a casing; the casing including a first portion which is close to the antenna and two adjacent portions which are further away from the antenna than the first portion; the proximity sensor being to detect a human body part when a human body part approaches close to a first portion of the casing.

6. The electronic device of claim 1 wherein the antenna, wireless transmitter, proximity sensor and controller are in a casing which includes a first wall and a second wall connected by a curved portion; the antenna being located inside the curved portion of the casing and a distance between the curved portion of the casing and the antenna being less than a distance between the first wall and the antenna and less than a distance between the antenna and an edge at which the curved portion joins the first wall or the second wall.

7. The electronic device of claim 6 wherein the proximity sensor is to detect a human body part when a human body part approaches close to the curved portion of the casing.

8. A computing device comprising:
an antenna including a first radiating element and a second radiating element; the second radiating element having a different length than the first radiating element;
a wireless transmitter to send a radio signal to the antenna;
a proximity sensor; and
a controller to connect the wireless transmitter to the first radiating element and to disconnect the wireless transmitter from the second radiating element, the controller to connect and disconnect the radiating elements based on a signal from the proximity sensor, only one of the first and second radiating elements connected to the wireless transmitter at a time.

9. The computing device of claim 8 wherein the controller is to connect the wireless transmitter to the second radiating element in response to the proximity sensor detecting an external object close to the antenna.

10. The computing device of claim 8 wherein the controller is to connect the wireless transmitter to the first radiating element in response to the proximity sensor not detecting an external object close to the antenna.

11. The computing device of claim 8 wherein the first radiating element is to transmit the radio signal at a higher efficiency than the second radiating element.

12. A computing device comprising:
a first radiating element and a second radiating element;
a wireless transmitter to send a radio signal to one of the first radiating element and the second radiating element;
a proximity sensor; and
a controller to switch the radio signal of the wireless transmitter from the first radiating element to the second radiating element in response to a signal from the proximity sensor, the controller to cause the radio signal to be provided to only one of the first and second radiating elements at a time,
wherein the first radiating element is to transmit at a higher power than the second radiating element.

13. The computing device of claim 12 wherein the signal from the proximity sensor is in response to the proximity sensor detecting a body part close to a first portion of a casing of the computer device.

14. The computing device of claim 13 wherein the transmitting power of the high power radiating element is within a SAR (Specific Absorption Rate) when a body part of a user is not in contact with a first portion of the casing and is above a SAR when a body part of a user is in contact with the first portion of the casing.

15. The computing device of claim 12 wherein the first radiating element is to transmit the radio signal at −2 dB to −4 dB and the second radiating element is to transmit the radio signal at −5 dB to −6 dB.

* * * * *